United States Patent [19]

Maruyama et al.

[11] Patent Number: 5,528,488
[45] Date of Patent: Jun. 18, 1996

[54] LEAD POSITIONING METHOD AND DEVICE USED FOR TAB-TYPE LEAD AUTOMATIC INSPECTION SYSTEM

[75] Inventors: Kazuo Maruyama, Machida; Hirokazu Tsuji; Takeshi Ikegami, both of Kawasaki, all of Japan

[73] Assignee: Tokyo Institute of Technology, Tokyo, Japan

[21] Appl. No.: 309,111

[22] Filed: Sep. 20, 1994

[30] Foreign Application Priority Data

Mar. 10, 1994 [JP] Japan ............................ 6-039647

[51] Int. Cl.⁶ ..................................... G06F 19/00
[52] U.S. Cl. ............... 364/167.01; 364/490; 364/559
[58] Field of Search ............... 364/167.01, 477, 364/559, 488–491, 468, 551.01; 269/71–73; 437/220; 219/56.1, 85.18; 348/87, 94, 95; 228/103, 4.5; 29/739, 740, 741

[56] References Cited

U.S. PATENT DOCUMENTS

| | | | |
|---|---|---|---|
| 4,606,490 | 8/1986 | Chan et al. | 364/477 X |
| 4,722,060 | 1/1988 | Quinn et al. | 364/490 |
| 4,815,001 | 3/1989 | Uthe et al. | 364/477 |
| 5,059,559 | 10/1991 | Takahashi et al. | 364/477 X |
| 5,097,406 | 3/1992 | Narasimhan et al. | 364/491 X |

*Primary Examiner*—Joseph Ruggiero
*Attorney, Agent, or Firm*—Spencer & Frank

[57] ABSTRACT

A TAB-type lead automatic inspection system is provided to position with high accuracy at high speed for improving reliability and productivity of inspecting.

A lead positioning method used for a TAB-type lead automatic inspection system or processing system, comprising fixing a product onto a table movable in an X-axis direction and two Y-axis directions in parallel to the product mounting surface, and positioning X-axis, Y-axis and rotational angle θ directions, and a lead positioning device used for a TAB-type lead automatic inspection system in a highly rigid translation mechanism provided with a pair of hinges in one sheet plate comprising microfeeding piezoelectric actuators for driving a translation mechanism of one axis in the X-axis direction and two axes in the Y-axis direction, and control means for feedbacking a lead positioning sensing signal, and driving each piezoelectric actuator, thereby positioning X, Y and θ directions with high accuracy at high speed.

9 Claims, 5 Drawing Sheets

FIG_3

LEAD POSITIONING METHOD AND DEVICE USED FOR TAB-TYPE LEAD AUTOMATIC INSPECTION SYSTEM

FIELD OF THE INVENTION

The present invention aims to position a tab type lead with a high accuracy and at a high speed, for improving the reliability and productivity of inspecting in a TAB-type lead automatic inspection system.

RELATED ART STATEMENT

A TAB-type lead is formed on a film, a sprocket is mated with a film frame perforation, and the sprocket is positioned by a stepping motor or a servomotor with an encoder. In this method, the final positioning is carried out by a lead frame feed driving system, or by moving an image acquisition system.

Prior methods are mechanically simple and often used when inspecting visually, but cannot obtain the high positioning accuracy necessary with automatic inspection due to film deflection, frame perforation mating, and torque variation of a motor. Moreover, it is difficult to accelerate the positioning speed of the prior methods, since they take much time for positioning. It is further impossible to carry out the positioning in multiple directions, and the positioning in a rotational angle direction by twisting.

SUMMARY OF THE INVENTION

An object of the invention is to provide a lead positioning method and device suitable for a TAB-type lead automatic inspection system by solving the abovementioned problems and improving lead positioning accuracy of the TAB-type lead automatic inspection system.

The present invention relates to a lead positioning method used for a TAB-type lead automatic inspection or processing system, comprising the steps of fixing a product to a table movable in an X-axis direction and two Y-axis directions parallel to the surface where the product is mounted, and positioning it in the X-axis, Y-axis and a rotational angle θ directions.

The present invention further provides a lead positioning method used for a TAB-type lead automatic inspection system, that comprises the steps of providing a table movable in X-axis, Y-axis and rotational angle θ directions by using flexure hinges of one sheet plate and piezoelectric actuators, fixing a lead on the table movable in X-axis, Y-axis and rotational angle θ directions after feeding a frame of the lead, sensing the lead position at that time by a position sensor, and controlling one axis of the X-axis direction and two axes of the Y-axis direction of the movable table of X-Y-θ by piezoelectric actuators which can be microfed by feedbacking the sensed signal, thereby precisely positioning the X-axis, Y-axis and rotational angle θ directions.

Another object of the present invention is to provide a lead positioning device used for a TAB-type lead automatic inspection system, comprising a highly rigid translation mechanism provided with a pair of hinges on one sheet plate, in which X, Y and θ directions are positioned with a high accuracy at high speed, and control means for driving each piezoelectric actuator by feedbacking a lead position sensing signal to the actuator for enabling microfeed and driving means for driving the translation mechanism in one axis of an X-axis direction and two axes of a Y-axis direction.

A further object of the present invention is to provide a lead positioning device used for a TAB-type lead automatic inspection system, comprising a highly rigid translation mechanism provided with a pair of hinges on one sheet plate on which surface is mounted an inspecting product, the translation mechanism being constructed to be translated to one axis of an X-axis direction and two axes of a Y-axis direction, providing a piezoelectric actuator for enabling a microfeed for driving the mechanism, and control means for driving the piezoelectric actuator of the translation mechanism to each direction of the X-axis, Y-axis and rotational angle θ directions, thereby positioning the X, Y and θ directions with a high accuracy and at high speeds.

The positioning of a rotational angle θ according to the present method is regulated by giving respectively different feeding values to a positioning table of two Y-axis directions (Y1 and Y2 directions). The present invention uses a piezoelectric actuator and a highly rigid hinge mechanism, so as to improve a response rate for positioning and to shorten rest time.

Therefore, in an inspecting process and processing step for a TAB-type lead which is liable to warp, the present invention remarkably improves lead positioning accuracy and at the same time attains high-speed positioning, that results in reliable lead products and an improvement of productivity. Therefore, the present invention is extremely useful for the manufacture of TAB-type leads for IC, for instance, requiring this kind of lead automatic inspection system.

DESCRIPTION THE PREFERRED EMBODIMENTS

The present invention is explained with respect to embodiments by referring to the accompanying drawings in detail.

Figure 1:
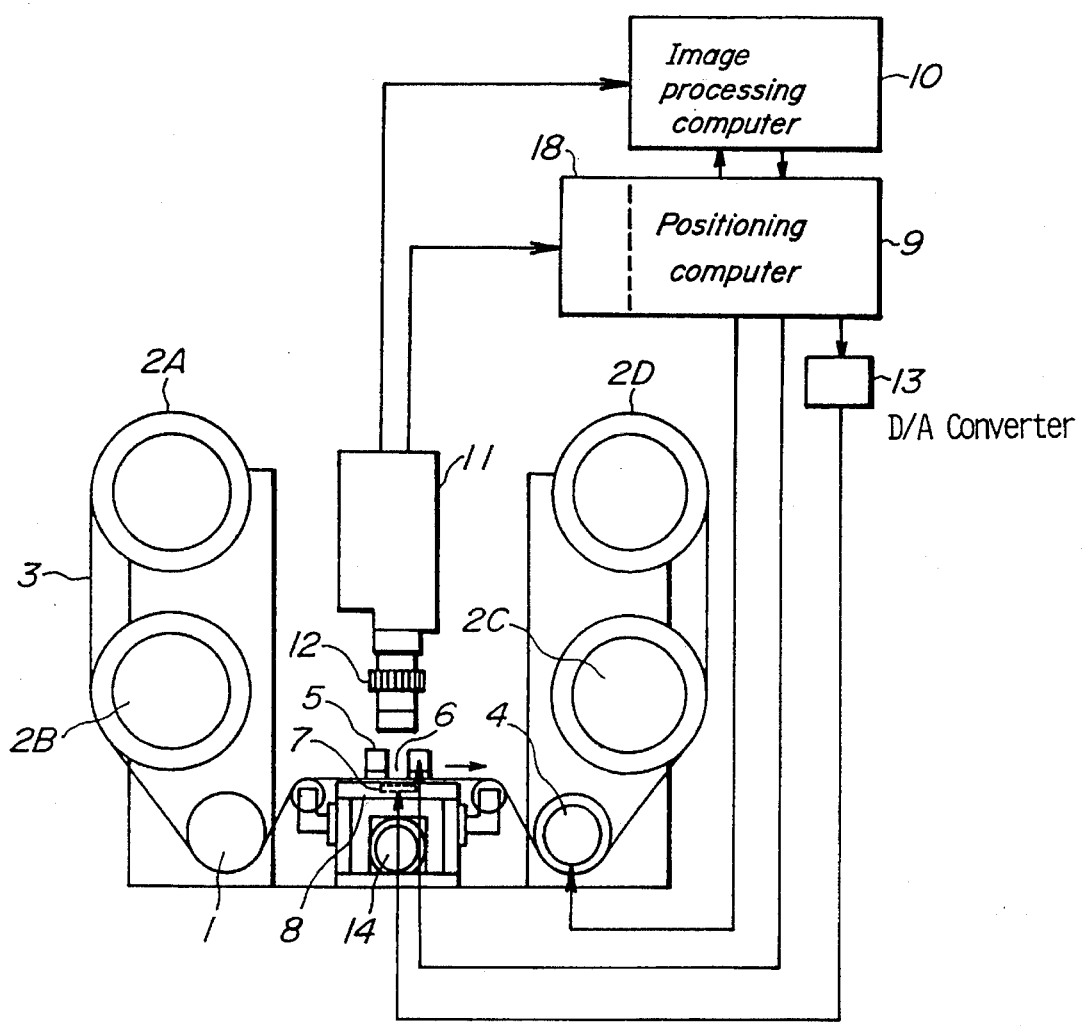
FIG. 1 is a schematic diagram showing an outlined structural embodiment of a TAB-type lead automatic inspection system with the aid of a lead positioning device.

FIG. 1 shows the whole construction of a TAB-type lead automatic inspection system. In FIG. 1, a TAB-type lead 3 wound around left and right tape runners 2A–2D is fed by a stepping motor 4 by one frame portion, given with a constant tension by a torque motor 1, and fixed onto a inspecting table 6 by a solenoid 5. The inspecting table 6 comprises an X-Y-θ stage 8 driven by piezoelectric actuators 7, 7X, 7Y1, 7Y2, for micropositioning the lead 3 (FIGS. 2) A positioning computer 9 is used for controlling positioning, and senses a position of the lead and controls the stepping motor 4, the solenoid 5 and the piezoelectric actuators 7. Reference numeral 10 is an image processing computer for inspecting a lead by processing an image sent from a CCD camera 11. Reference numeral 12 is a microscope attached to an end of the CCD camera 11, 13 is a D/A converter attached to the positioning computer 9, and 14 is a stage illuminating lamp.

Figure 2:
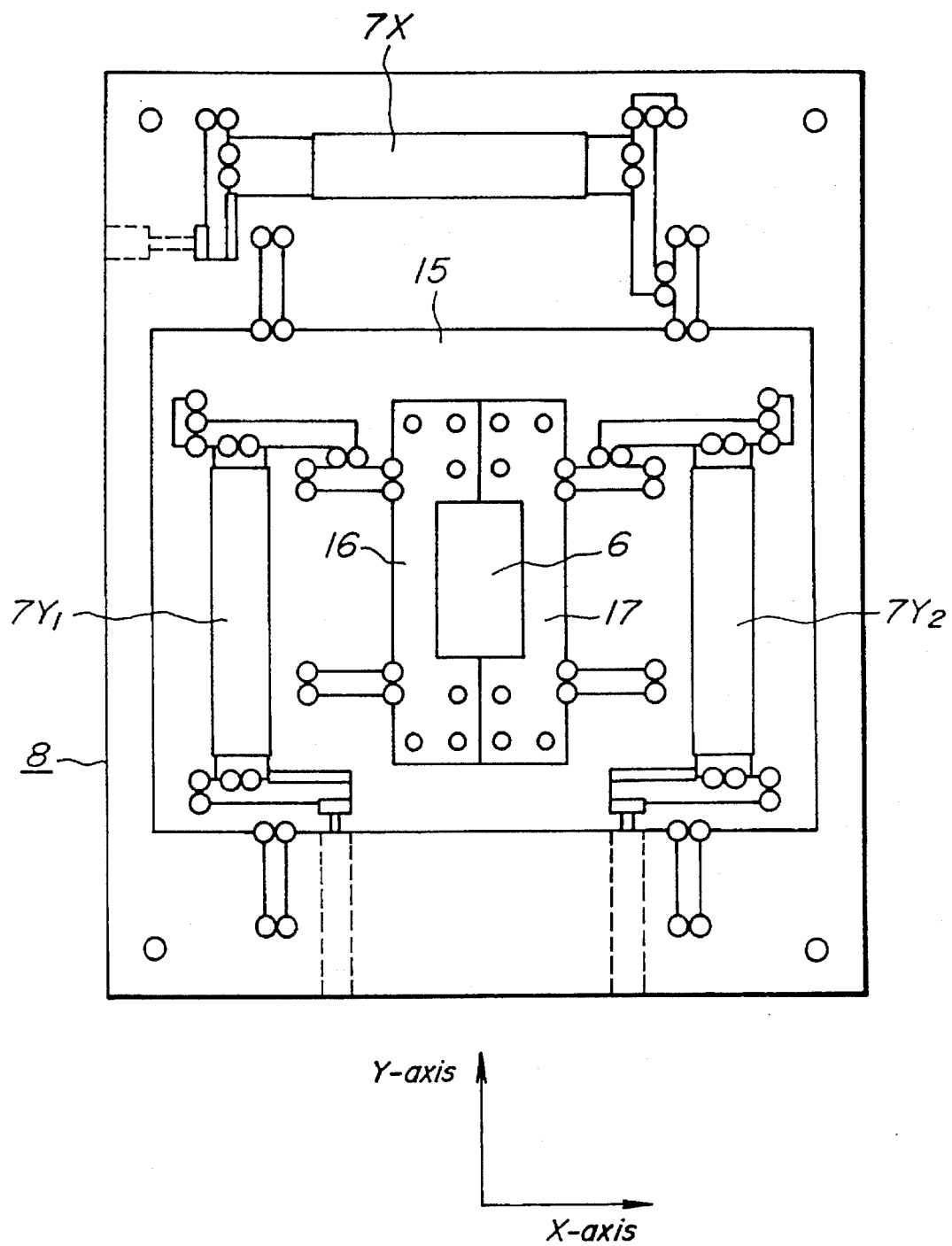
FIG. 2 is a diagram showing a structural embodiment of an X-Y-θ stage for lead positioning used in an automatic inspection system.

FIG. 2 shows an X-Y-θ stage 8. A lead as a inspecting object is fixed to the center of a stage, for the positioning in a feeding direction (X-axis direction) using an X-stage 15, positioning in a vertical direction (Y-axis direction) relative to the feeding direction using a Y1-stage 16 and a Y2-stage 17, and for positioning in a rotational direction (rotational angle θ). Displacements of three piezoelectric actuators 7X, 7Y1 and 7Y2 are transmitted to respective stages via a displacement magnifying mechanism. The displacement magnifying ratio is about 4 times, and displacement of a stage corresponds to 0–100 μm with respect to an input voltage of 0–150 V to the piezoelectric actuators 7X, 7Y1 and 7Y2.

A lead is positioned in three steps of one frame feeding by the stepping motor 4, microfeeding using the stepping motor 4, and positioning using the X-Y-θ stage 8. One frame feeding by the stepping motor 4 is carried out by sending a previously obtained pulse to the motor. The microfeeding by the stepping motor 4 and the positioning by the X-Y-θ stage 8 occurs by sensing a position of the lead, comparing the position with a position of a reference image, and feeding back a displacement amount corresponding to the difference between the sensed position of the lead and the position of the reference image. The position is sensed by using image data input in an image processing board 18 attached to the positioning computer 9.

Figure 3:
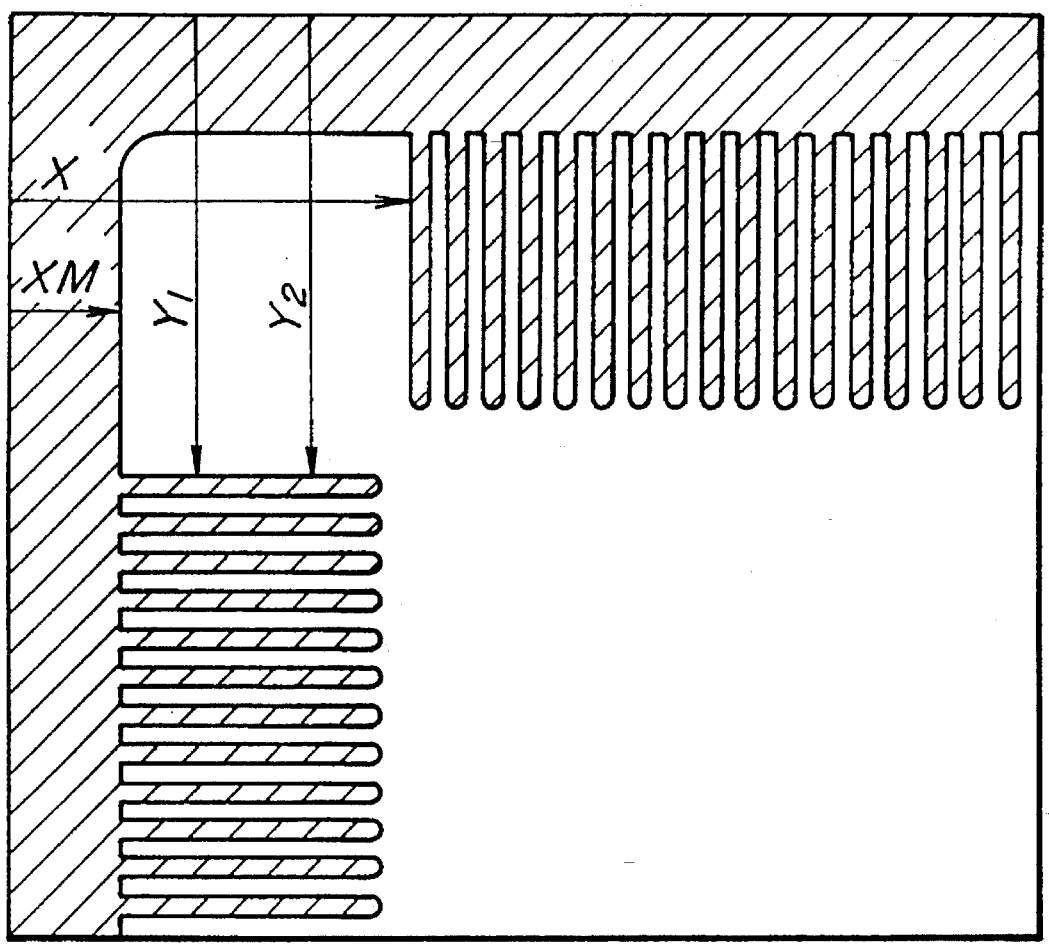
FIG. 3 is a schematic diagram of TAB-type leads to be inspected.

FIG. 3 is a schematic diagram showing a part of the lead. An XM edge in FIG. 3 is sensed for microfeeding of the motor, and X, Y1 and Y2 edges are sensed for positioning of the X-Y-θ stage 8. The positioning of a rotational angle direction is carried out by calculating a rotational amount from the Y1 and Y2 edges and independently moving a Y1-stage 16 and a Y2-stage 17.

Figure 4:
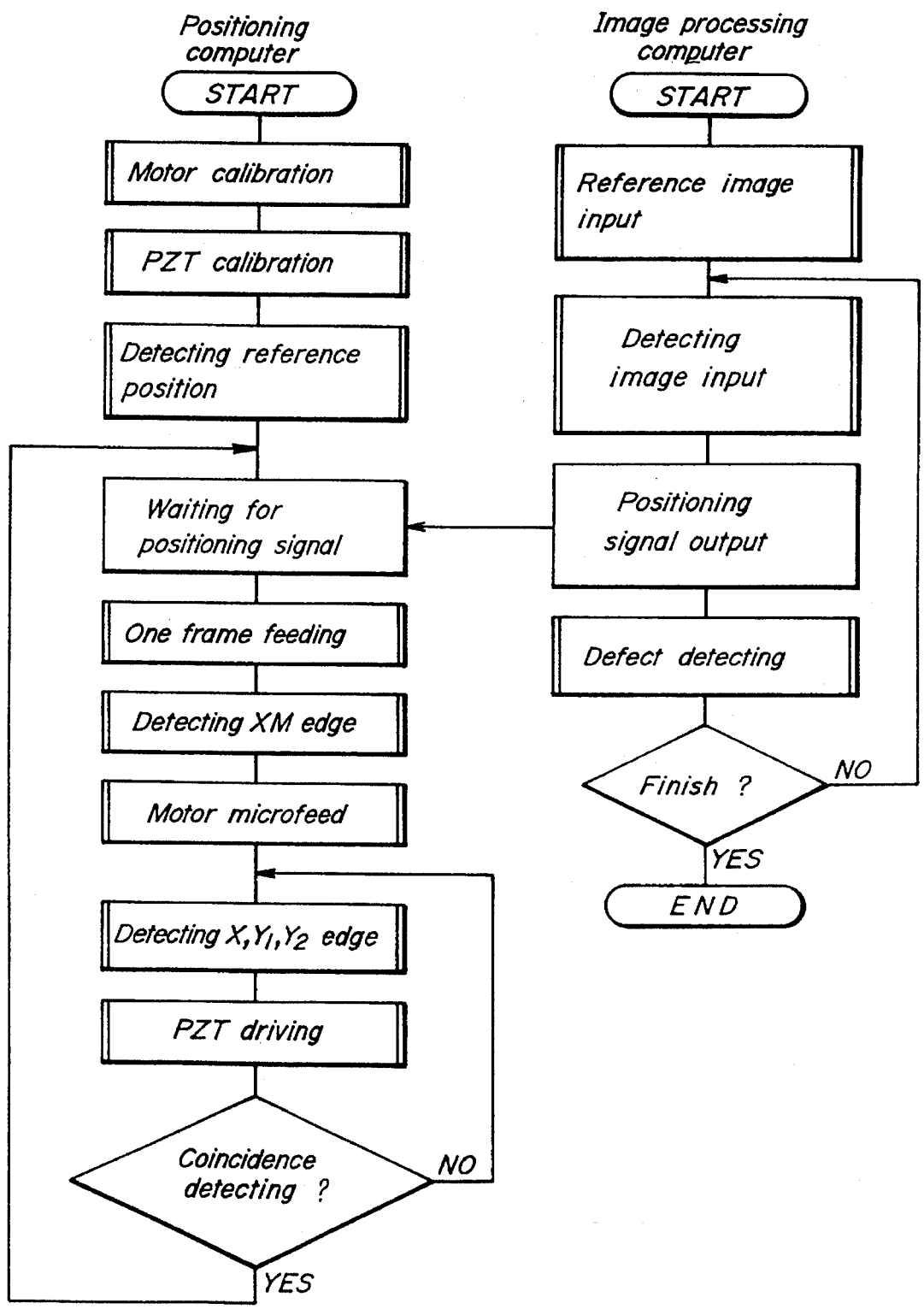
FIG. 4 shows a flow chart of a TAB-type lead automatic inspection system.

FIG. 4 shows a flow chart of an automatic inspection system. In the present device, defect detection is simultaneously carried out with the positioning, so as to realize high-speed inspection.

As shown in FIG. 4, when the positioning computer 9 is started, motor calibration is activated to calculate a moving amount per one pulse of the stepping motor 4. Next, PZT (piezoelectric actuator) calibration is activated to calculate a moving amount per one volt of the piezoelectric actuator. Next, reference images X, Y1 and Y2 edges are sensed, recorded as reference images and stored. Thus, inspecting preparation is completed, and the stages wait for a positioning signal output from the image processing computer 10. In the image processing computer 10, in parallel to the processing so far, the reference images are taken and processed, and the reference images information is recorded and stored in the image processing computer 10. The processing so far is an initial setting.

After the initial setting, a lead 3 fixed on a detecting table 6 of an X-Y-θ stage 8 is observed by a microscope 12 attached to the end of a CCD camera 11, and the image information as an inspecting image is taken in an image processing computer 10 via the CCD camera 11, and the image is processed. Moreover, after the initial setting, the same image as the reference image is taken, but it is for confirming the action, and no defect can be sensed from the image.

Immediately after recording an inspecting image, the image processing computer 10 sends a positioning signal output to a positioning computer 9. The positioning computer 9 feeds a lead by one frame, senses an XM edge, microfeeds a motor, senses X, Y1 and Y2 edges, drives each of piezoelectric actuators 7X, 7Y1 and 7Y2, and positions the lead 3 on the X-Y-θ stage 8 until the position agrees to the reference position.

The image processing computer 10 compares the inspecting image with the stored reference image, obtains a difference between them, senses presence of a defect, that is, inspects the lead, moves to the next lead after completion of this detecting, and repeats this operation.

While the image processing computer 10 senses a defect, the positioning computer 9 feeds a lead by one frame, senses an XM edge, microfeeds a motor, senses X, Y1 and Y2, drives piezoelectric actuators, completes control, and waits for a positioning signal of the next frame. The operation is repeated.

Figure 5:
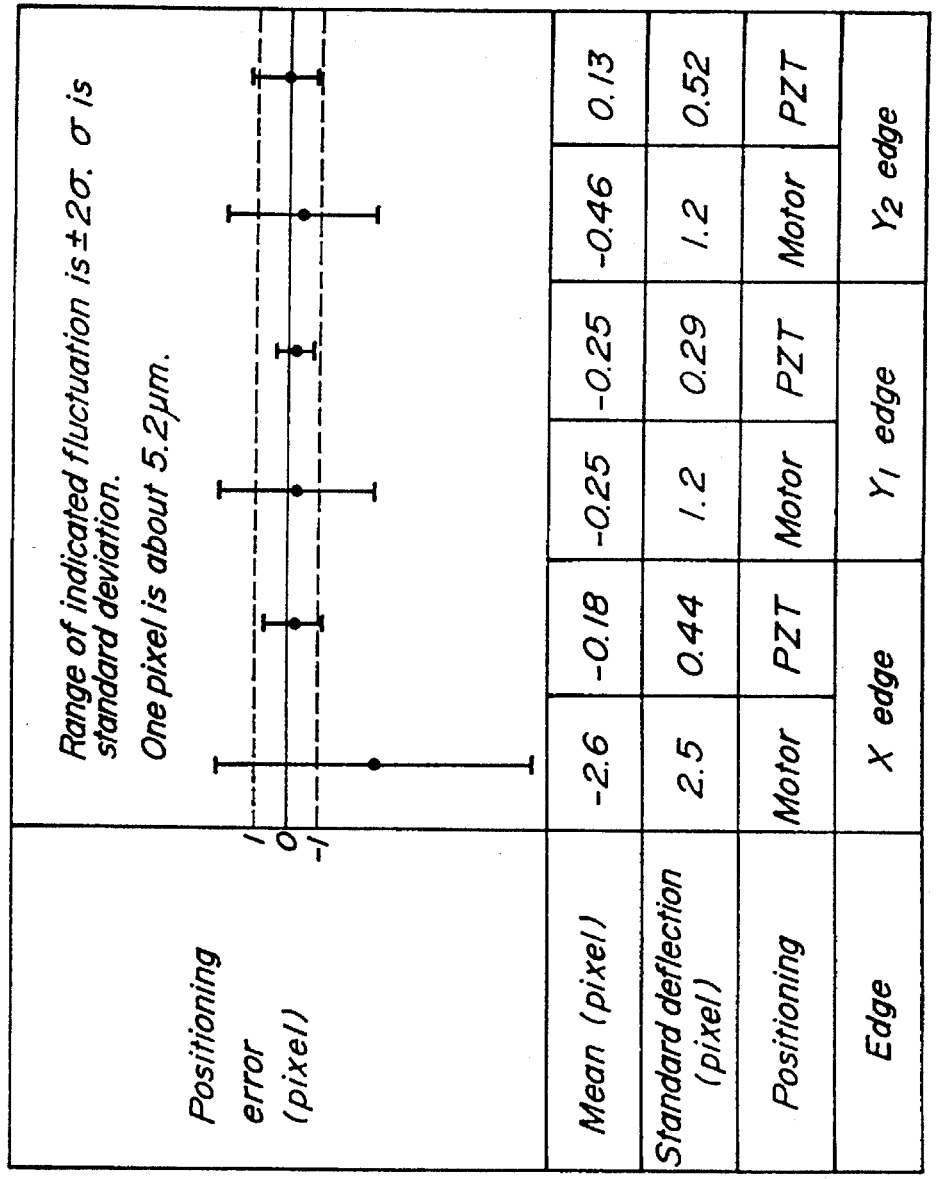
FIG. 5 shows a comparison between positioning accuracy obtained by the present invention and the prior method.

FIG. 5 shows the measured results by comparing the case of operating an automatic inspection system according to the present invention and using an X-Y-θ stage with respect to the obtained positioning accuracy with the case of using a stepping motor only without using any X-Y-θ stage. With respect to respective lead edges, the fluctuation from respective edge positions in a reference image is expressed in standard deviation $\sigma$ as a positioning error. As a result, with the use of an X-Y-θ stage according to the present invention, positioning accuracy is remarkably improved, and positioning of about ±1 pixel (5.2 μm) is attained.

In lead inspecting, defect sensing is carried out by a pattern matching method with the use of a CCD camera and an image processing computer. This method senses a defect by comparing a reference image with an inspecting image, so that there is the possibility of sensing the positioning error as a defect. The accuracy of a positioning device with the use of the present invention is within ±1 pixel of the image processing computer, so that an image taking an error with the reference image therefrom is shrunk, and an isolated point within 1 pixel is removed, so as to prevent the positioning error from being sensed as a defect. As a result, it becomes possible to sense a defect of 2 pixels, a defect of more than about 10 μm.

Moreover, the present invention has great advantages in applications of industry, such as positioning in any image processing system other than the inspecting process.

We claim:

1. A method for positioning a lead in a TAB-type lead automatic inspection or processing system, comprising the steps of;

mounting the lead on a surface of a table movable in an X-axis direction, and two independent Y-axis directions parallel to the surface of the table and perpendicular to the X-axis direction;

selectively moving the table in the X-axis direction and the Y-axis directions; and controlling, during said moving step, a displacement of the table in one of the Y-axis direction relative to the other Y-axis direction to effect a simultaneous rotational movement of the table.

2. The method defined in claim 1, wherein said controlling step is effected using the following steps:

determining a reference position using a positioning computer;

observing the lead using a CCD camera and forwarding image information therefrom to an image processing computer;

generating a positioning signal using the image processing computer and transmitting the positioning signal to the positioning computer; and comparing the reference position with the positioning signal.

3. A lead positioning device in a TAB-type lead automatic inspection system, comprising;

a rigid displacement mechanism movable in X, Y and θ directions with a high degree of accuracy, and at a high speed;

a plurality of piezoelectric actuators attached to said displacement mechanism; and control means for microfeeding the rigid displacement mechanism in an X-axis direction and two separate Y-axis directions by feeding back a positioning signal, representative of a position of three separate detected points on the lead, to a respective actuator, said control means comprising:

image processing means comprising an image processing computer and a CCD camera for observing the lead, said image processing means generating and transmitting the positioning signal; and positioning means comprising a positioning computer that receives the positioning signal from said image processing means, said positioning means determining a reference position of the lead and actuating a respective actuator to register the three separate detected edges of the lead with the reference position.

4. The lead positioning device defined in claim 3, wherein said control means controls a displacement of the rigid displacement mechanism in one of the Y-axis direction relative to the other Y-axis direction to effect a simultaneous rotational movement of the rigid displacement mechanism in an angle θ direction.

5. The lead positioning device defined in claim 3, wherein said rigid displacement mechanism comprises at least one sheet plate having a pair of hinges attached thereto.

6. The lead positioning device defined in claim 3, wherein said CCD camera generates an inspecting image of the lead, and wherein said image processing computer comprises means for comparing the inspecting image with a stored reference image, obtaining a difference between the two images, and sensing the presence of a defect.

7. The lead positioning device defined in claim 3, wherein said positioning means includes means for feeding the lead by one frame, sensing a first edge of the lead and microfeeding a motor in response thereto, sensing the three separate edges of the lead, and driving the piezoelectric actuators.

8. A method for positioning a lead used in a TAB-type lead automatic inspection system, comprising the steps of;

providing a table movable in an X-axis direction, two Y-axis directions, and a rotational angle θ direction using flexure hinges attached to one sheet plate, and piezoelectric actuators;

feeding a frame of the lead;

fixing the lead on the table subsequent to said feeding step;

sensing the lead position during said fixing step; and controlling the movement of the table in the X-axis direction, the two Y-axis directions, and the rotational angle θ direction using the piezoelectric actuators by feeding back a sensed signal to microfeed the actuators, causing a displacement of the table in the X-axis and Y-axes directions, and causing a displacement in one of the Y-axis directions relative to the other Y-axis direction to effect a simultaneous rotational movement of the table in the rotational angle θ direction, thereby precisely positioning the table.

9. A lead positioning device in a TAB-type lead automatic inspection system, comprising:

a highly rigid displacement mechanism provided with a pair of hinges on one sheet plate on which surface is mounted an inspecting product, said displacement mechanism being movable in one X-axis direction and two Y-axis directions;

a piezoelectric actuator for microfeeding the mechanism; and control means for driving the piezoelectric actuator in each of the X-axis and Y-axis directions, and a rotational angle θ direction, thereby positioning the mechanism in the X, Y and θ directions with a high degree of accuracy and at a high speed.

* * * * *